May 28, 1946. S. D. POOL ET AL 2,401,183
TRACTOR-MOUNTED IMPLEMENT
Filed Dec. 23, 1943 2 Sheets-Sheet 1
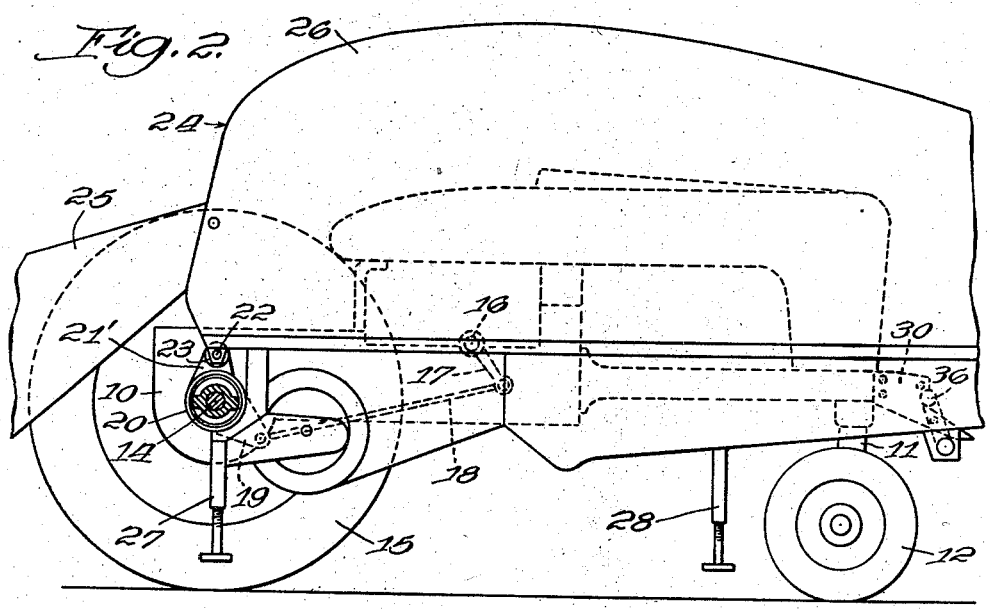
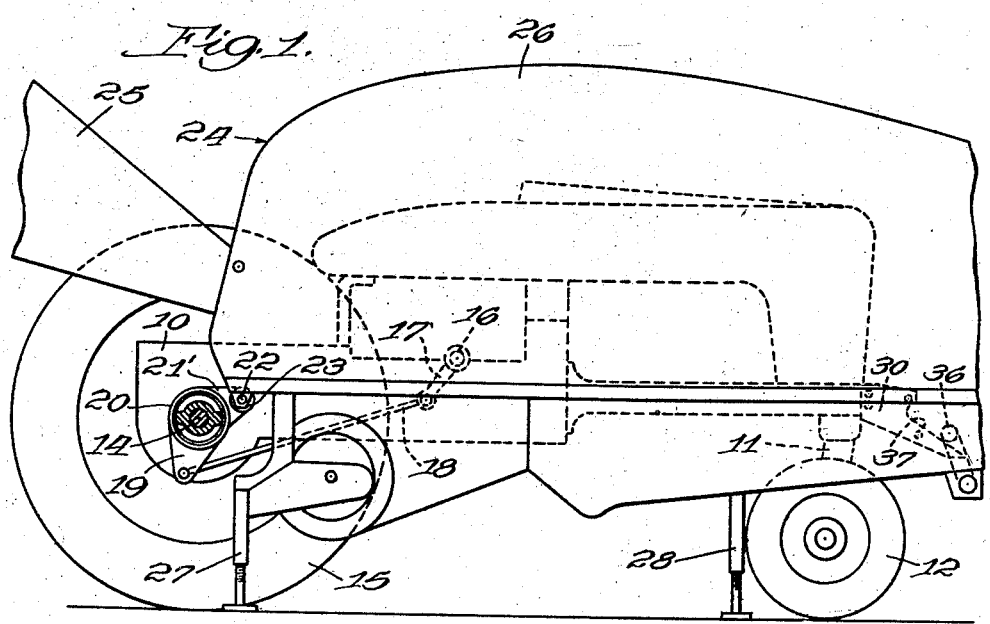
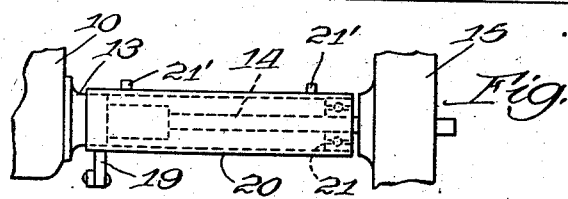
Inventors:
Stuart D. Pool and
Rexford D. Downing
By Paul O. Pippel
Atty.

Inventors:
Stuart D. Pool and
Rexford D. Downing.
By Paul O. Pippel
Atty.

Patented May 28, 1946

2,401,183

UNITED STATES PATENT OFFICE 2,401,183

TRACTOR-MOUNTED IMPLEMENT

Stuart D. Pool, Moline, and Rexford D. Downing, Rock Island, Ill., assignors to International Harvester Company, a corporation of New Jersey Application December 23, 1943, Serial No. 515,330

14 Claims. (Cl. 56—10)

This invention relates to a tractor and implement combination. More specifically, it relates to a lifting construction for mounting an implement on a tractor.

In recent years since the advent of the general purpose farm tractor, the trend has been to mount the implement directly on the tractor rather than to trail it behind as has been the common practice. In the case of large implements such as grain machines, considerable difficulty has been experienced in connecting and disconnecting the implement due to its weight and large size. The harvester thresher is particularly large and unwieldy. Due to the unevenness of the ground in general and to the fact that an implement stored on jacks may sink into the ground somewhat, it is necessary to have sufficient range in providing a lifting structure to take care of a certain amount of change in height between the cooperating lifting members on the tractor and on the implement.

The principal object of the present invention is to provide an improved lifting structure for mounting implements on tractors. A more specific object is to provide a lifting structure utilizing power from a tractor power-lift mechanism which lifts one portion of the implement, another portion being elevated by movement of the implement on an inclined mounting member. Another object is to provide spaced supporting means that readily detach clamping means which will hold an implement mounting part securely in position against movement in any direction. Other objects and the construction by which they are attained will appear in the following disclosure.

According to the present invention, an implement such as a harvester thresher is lifted from an inoperative position in which it rests on the ground to an operative position in which it is raised and mounted upon a tractor by power-operated lifting members moving angularly about the tractor rear axle and by a mechanical inclined plane type of lifting structure at the other end of the tractor. The power-operated lifting means on the rear axle structure may be the structure shown in detail and claimed in application Serial No. 490,267, filed June 10, 1943, or the equivalent thereof. The present invention is an improvement in the device shown in said application, the improvement consisting in omitting the power-operated lifting linkage at the front of the tractor and substituting an inclined plane type of mounting structure.

In the drawings:

Figure 1 is an elevation with one wheel removed, showing a tractor and an implement on jacks in a position ready for mounting on the tractor;

Figure 2 shows the same structure as Figure 1, with the implement in its mounted position on the tractor;

Figure 3 is a rear elevation showing the lifting structure on the rear axle of the tractor;

Figure 4:
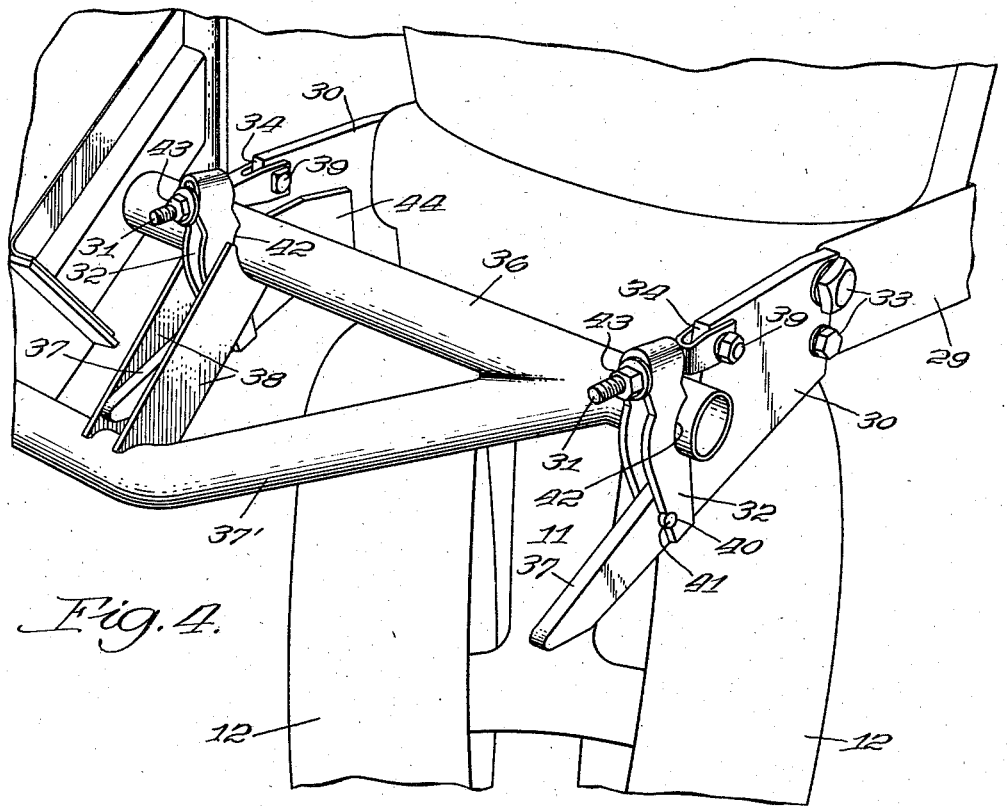
Figure 4 is a perspective showing the mounting structure at the front of the tractor.
Figure 5:
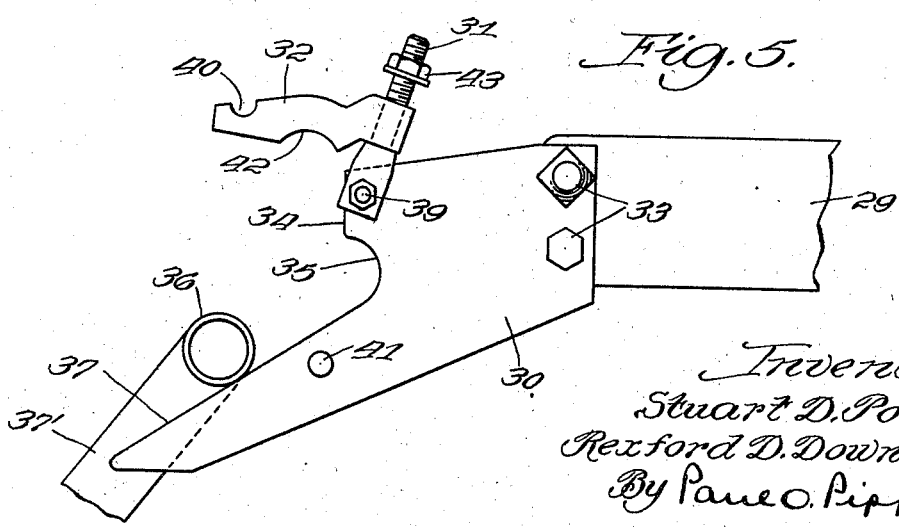
Figure 5 is a side elevation showing one unit of the mounting structure, with the clamping means in open position and with the mounting member on the implement in an intermediate position during mounting of the implement.

The tractor illustrated in the drawings may be of the conventional tricycle type provided with an extended rear axle construction at one side, or it may be of the offset tricycle type with the wheel at the implement side widely spaced from the tractor body, as shown in Figure 3, and the wheel at the other side located closely adjacent the body structure of the tractor. The parts of the tractor shown include a narrow body portion 10, a steerable front support consisting of a standard 11 and closely spaced wheels 12, rear axle housings 13, a drive axle 14, and tractor wheels 15, one of which is mounted on the drive axle 14 and the other of which is mounted on a corresponding axle, not shown, at the other side of the tractor. The housing 13 and the axle 14 constitute an extended rear axle structure, by means of which the corresponding traction wheel 15 is spaced from the body 10 of the tractor a sufficient distance to provide a wide lateral space necessary for the implement to be mounted.

As above pointed out, the power-operated lifting means located on the rear axle is in itself not a part of the present invention, except in combination with the mounting structure at the other end of the tractor. As diagrammatically shown in this disclosure, said lifting means includes a power-operated lifting shaft 16 on which a lifting arm 17 is carried. The lifting shaft and lifting arm may be operated by any conventional power lift mechanism, several types of which are in extensive use at the present time. A link 18 connects the lever arm 17 with a lever 19 carried by a cylindrical member or sleeve 20, which surrounds the axle housing 13 and the axle 14 extending substantially from the wheel 15 to the body 10 of the tractor. Said sleeve at the wheel end is rotatably carried on the axle 14 by a bearing 21 indicated as being an anti-friction type of bearing. The other end of the sleeve 20 is journaled on the axle housing 13. No special bearing is required at this end as the rotative movement occurs only upon oscillation of the sleeve to lift and lower the implement. A pair of spaced lifting brackets 21' rigidly secured to the sleeve 20 are provided with openings, by means of which they may be secured by pins 22 to brackets 23 carried on an implement 24. Said implement is illustrated as a harvester thresher and consists of a crop-gathering or harvester unit 25 and a thresher unit 26. Any other type of implement may be mounted in the same manner, and in the following description the term implement will be used rather than any terminology describing the harvester thresher as illustrated.

Adjustable jacks 27 and 28 are shown at the front and rear of the implement in Figure 1, said jacks being in contact with the ground and in said figure supporting the weight of the implement. It will be understood that any number of jacks may be utilized, it being necessary to have at least three to support the implement in a stable position when it is dismounted from the tractor. Preferably two spaced jacks will be used both at the front and at the rear.

It will be noted in Figure 1 that the lifting brackets 21' extend rearwardly from the sleeve 20, and that the lever 19 extends downwardly and forwardly in the direction of travel of the machine when operated. To avoid confusion in the description, the axle structure of the tractor will be considered the rear, and the wheels 12 will be considered the front of the tractor. When other terms are used, it will be specified that the direction indicated has reference to the direction of the machine during operation, which with the implement shown is opposite to the normal direction of travel of a tricycle tractor.

At the front of the tractor, two mounting units are rigidly secured to side frame members 29 of the tractor body 10. Said units each consist of a mounting member 30, a hinged securing bolt 31, and a clamping member 32. As the units are identical, corresponding reference characters will be used, and one unit will be described in detail. The mounting member 30 is rigidly secured to the side frame 29 by cap screws 33, said cap screws utilizing the threaded openings provided on general purpose tractors for attaching implements thereto. Said member is in the form of a flat steel plate extending longitudinally of the tractor forwardly thereof. Forwardly on the member 30, a vertical edge 34 is formed, terminating in a semicylindrical notch 35, which provides receiving means for a mounting member in the form of a pipe 36 rigidly carried on the implement and extending laterally therefrom across the front of the tractor. The lower portion of the notch 35 joins with a downwardly inclined cam surface 37, which is of a sufficient length to accommodate the movement of the implement during mounting. Said inclined cam surface has a sufficient rise in the distance of travel of the implement during mounting to lift the implement to the desired height.

As shown in Figure 4, the pipe 36 is braced by a second pipe 37' also secured to the implement. Additional brace members 38 are also provided between the pipes 36.

The hinged bolt 31 is pivotally secured by a bolt 39 to the member 30 above the semicircular notch 35. The clamping member 32 is formed by a U-shaped piece of metal with the lugs closely spaced together, the space being just sufficient to permit passage of the bolt 31 and to permit the clamping member to straddle the member 30.

At the end of the clamping member 32 opposite the bolt 31, a pair of alined semicircular notches 40 is provided for engaging a pin 41 fixed in the member 30 below and spaced forwardly of the notch 35. The clamping member is also provided with alined arcuate notches 42 adapted to engage the pipe 36, as shown in Figure 4, when it is at the upper end of the cam surface 37 adjacent the notch 35. A threaded nut 43 on the bolt 31 has sufficient distance of adjustment on the bolt to permit engagement of the clamping member with the pin 41, although the pipe 36 has not been moved to its final position in the notch 35. The nut 43 may then be tightened to draw the pipe into position and to firmly clamp it in position.

When both of the mounting units are tightened into position against the pipe 36, the implement is securely held against fore and aft movement and against tipping with respect to the tractor about a longitudinal axis. Plates 44 welded to the pipe 36 fit inside the members 30 to securely hold the pipe 36 and the implement to which it is attached against lateral movement with respect to the tractor.

The function and operation of the parts making up applicants' structure have been described in connection with the description of the parts. When the power lift lever arm 17 is moved from the position shown in Figure 1 to the position shown in Figure 2, the sleeve 20 is moved in an angular direction to bring the mounting brackets 21 to the position shown in Figure 2. The front end of the implement is thereby lifted and moved rearwardly on the tractor, lifting the jacks from the ground and raising the implement to the desired height. In the harvester thresher construction illustrated, the harvester part 25 is shown as lifted clear of the axle structure for the mounting or dismounting of the implement. In other types of implements where there is no portion overhanging the rear axle structure, it would not be necessary to adjust the implement in this manner for removal from or mounting on the tractor.

During the operation of the lifting structure at the rear end of the tractor from the position shown in Figure 1 to the position shown in Figure 2, the other end of the implement which is at the front end of the tractor is lifted, as indicated in dotted lines. The pipe 36 is first moved over the lower ends of the mounting members 30 during initial backing of the tractor into position for mounting the implement. It is only necessary that the pipe 36 be in a position to be engaged by the cam surfaces 37 of the members 30 during forward movement of the implement as it is mounted. During said forward movement, the pipe 36 moves up the inclined surfaces 37 to the position shown in Figure 2. It will be noted that the clamping members 32 have not been shown in Figures 1 and 2, as the small size of these parts in the figures of reduced size would tend to confuse the showing.

In the removal of the implement from the tractor the above described procedure is reversed. The jacks 27 and 28 are first lowered into position after they have been folded or removed and are adjusted so as to contact the ground upon the range of movement provided by the lifting structure. The clamping members are then loosened, and the power lift mechanism is operated to set the implement on the jacks.

It will be understood that any type of lifting structure may be utilized on the tractor rear axle which will give the desired forward movement of the implement necessary to operate the cam or inclined plane lift at the front of the tractor. Additional securing means may be utilized at the rear of the tractor for holding the implement after it has been mounted. All of these variations in structure and others which come under the appended claims are contemplated as a part of the invention.

What is claimed is:

1. In a tractor and implement combination, a tractor, an implement positioned alongside the tractor, power-operated lifting means on the tractor operative to engage one portion of the implement and move the same vertically and in one longitudinal direction, and implement mounting structure including a mounting member on the tractor sloping downwardly in a direction opposite to the longitudinal direction of movement of the implement when it is being mounted and a member on the implement engageable with said mounting member to raise the adjacent portion of the implement when it is being moved by said power lifting means.

2. In a tractor and implement combination, a tractor, an implement positioned alongside the tractor, power-operated lifting means on the tractor operative to engage one portion of the implement and move the same vertically and in one longitudinal direction, and implement mounting structure including a mounting member on the tractor sloping downwardly in a direction opposite to the longitudinal direction of movement of the implement when it is being mounted, a member on the implement engageable with said mounting member to raise the adjacent portion of the implement when it is being moved by said power lifting means, and means for removably clamping said members together.

3. In a tractor and implement combination, a tractor, an implement positioned alongside the tractor, power-operated lifting means on the tractor operative to engage one portion of the implement and lift the same simultaneously moving the implement in one direction, and additional implement mounting structure including a mounting member on the tractor sloping downwardly in a direction opposite to the direction of movement of the implement when it is being mounted and a member on the implement engageable with said mounting member to raise the adjacent portion of the implement when it is being lifted and moved by said power lifting means.

4. In a tractor and implement combination, a tractor having an extended axle structure at one side, an implement, power-operated lifting means on the axle structure operative to engage one portion of the implement and lift the same simultaneously moving the implement in one direction, and implement mounting structure on the tractor including spaced mounting members sloping downwardly in a direction opposite to the direction of movement of the implement when it is being mounted and means on the implement engageable with said lifting members to raise the adjacent portion of the implement when it is being lifted and moved.

5. In a tractor and implement combination, a tractor, an implement positioned alongside the tractor, power-operated lifting means on the tractor operative to engage one portion of the implement and move the implement in one direction, and implement mounting structure on the tractor including spaced mounting members sloping downwardly in a direction opposite to the direction of movement of the implement when it is being mounted, a shaft-like member extending from the implement engageable with said mounting members to raise the adjacent portion of the implement when it is being moved, said lifting members having notches formed at the upper ends of the sloping portions, and removable clamp means for securing said shaft-like member to said mounting members.

6. In a tractor and implement combination, a tractor, an implement positioned alongside the tractor, power-operated lifting means on the tractor operative to engage one portion of the implement and move the implement in one direction, and implement mounting structure on the tractor including spaced mounting members sloping downwardly in a direction opposite to the direction of movement of the implement when it is being mounted, a shaft-like member extending from the implement engageable with said mounting members to raise the adjacent portion of the implement when it is being moved, said lifting members having notches formed at the upper ends of the sloping portions, removable clamp means for securing said shaft-like member to said mounting members, and means carried by the shaft-like member engageable with one of the mounting members to hold said member and the implement against lateral movement with respect to the tractor.

7. In a tractor and implement combination, a tricycle type of tractor having an extended axle structure at one side, an implement, power-operated lifting means on the axle structure adapted to engage the implement and lift the portion adjacent the axle simultaneously moving the implement toward and over the axle structure, and implement mounting structure on the tractor rearwardly of said axle structure including a mounting member sloping downwardly in a direction opposite to the direction of movement of the implement when it is being mounted and a member on the implement engageable with said mounting member to raise the adjacent portion of the implement when it is being moved toward the axle structure by the lifting means.

8. In a tractor and implement construction, a tricycle type of tractor having an extended axle structure at one side, an implement, power-operated lifting means on the axle structure adapted to engage the implement and lift the portion adjacent the axle simultaneously moving the implement toward the axle structure, and implement mounting structure on the tractor rearwardly of said axle structure including laterally spaced mounting members sloping downwardly in a direction opposite to the direction of movement of the implement when it is being mounted and a laterally extending member on the implement engageable with said mounting members to raise the adjacent portion of the implement when it is being moved toward the axle structure by the lifting means.

9. In a tractor and implement combination, a tricycle type of tractor having an extended axle structure at one side, an implement, power-operated lifting means on the axle structure adapted to engage the implement and lift the portion adjacent the axle simultaneously moving the implement toward and over the axle structure, and implement mounting structure on the tractor rearwardly of said axle structure including laterally spaced mounting members sloping downwardly in a direction opposite to the direction of movement of the implement when it is being mounted and a laterally extending member on the implement engageable with said mounting members to raise the adjacent portion of the implement when it is being moved toward the axle structure by the lifting means.

10. In a tractor and implement combination, a tricycle type of tractor having an extended axle structure at one side, an implement, power-operated lifting means on the axle structure adapted to engage the implement and lift the portion adjacent the axle simultaneously moving the implement toward the axle structure, and implement mounting structure on the tractor rearwardly of said axle structure including a mounting member sloping downwardly in a direction opposite to the direction of movement of the implement when it is being mounted, a member on the implement engageable with said mounting member to raise the adjacent portion of the implement when it is being moved toward the axle structure by the lifting means, and means for locking said mounting member and the member on the implement against relative displacement.

11. In a tractor and implement construction, a tricycle type of tractor having an extended axle structure at one side, an implement, a lifting structure mounted for oscillation on said axle structure, power-operated means for angular movement of the lifting structure, lifting means on the lifting structure adapted to engage the implement and lift the portion adjacent the axle simultaneously moving the implement toward the axle structure, and implement mounting structure on the tractor rearwardly of said axle structure including a mounting member sloping downwardly in a direction opposite to the direction of movement of the implement when it is being moved and a member on the implement engageable with said mounting member to raise the adjacent portion of the implement when it is being moved toward the axle structure by the lifting means.

12. In a tractor and implement construction, a tricycle type of tractor having an extended axle structure at one side, an implement, a lifting structure mounted for oscillation on said axle structure, power-operated means for angular movement of the lifting structure, lifting means on the lifting structure adapted to engage the implement and lift the portion adjacent the axle simultaneously moving the implement toward the axle structure, and implement mounting structure on the tractor rearwardly of said axle structure including laterally spaced mounting members sloping downwardly in a direction opposite to the direction of movement of the implement when it is being moved and a laterally extending member on the implement engageable with said mounting members to raise the adjacent portion of the implement when it is being moved toward the axle structure by the lifting means.

13. In a tractor and implement construction, a tricycle type of tractor having an extended rear axle structure at one side, an implement, a lifting structure mounted for oscillation on said axle structure, power-operated means for angular movement of the lifting structure, lifting means on the lifting structure adapted to engage the implement and lift the portion adjacent the axle simultaneously moving the implement toward the axle structure, and implement mounting structure on the front of the tractor including laterally spaced mounting members connected to the front of the tractor and extending forwardly beyond the front end thereof, said members sloping downwardly in a forward direction, and a laterally extending member on the implement engageable with said mounting members to raise the adjacent portion of the implement when it is being moved toward the axle structure by the lifting means.

14. In a tractor and implement construction, a tricycle type of tractor having an extended rear axle structure at one side, an implement, a lifting structure mounted for oscillation on said axle structure, power-operated means for angular movement of the lifting structure, lifting means on the lifting structure adapted to engage the implement and lift the portion adjacent the axle simultaneously moving the implement toward and over the axle structure, and implement mounting structure on the front of the tractor including laterally spaced mounting members connected to the front of the tractor and extending forwardly beyond the front end thereof, said members sloping downwardly in a forward direction, and a laterally extending member on the implement engageable with said mounting members to raise the adjacent portion of the implement when it is being moved toward the axle structure by the lifting means.

STUART D. POOL.
REXFORD D. DOWNING.